United States Patent [19]

Metzdorff et al.

[11] Patent Number: 5,048,950

[45] Date of Patent: Sep. 17, 1991

[54] OPTICAL RADAR

[75] Inventors: Walter Metzdorff, Friedrichshafen; Peter Lux, Langenargen; Max Eibert, Friedrichshafen, all of Fed. Rep. of Germany

[73] Assignee: Dornier GmbH, Munich, Fed. Rep. of Germany

[21] Appl. No.: 523,125

[22] Filed: May 14, 1990

[30] Foreign Application Priority Data

May 12, 1989 [DE] Fed. Rep. of Germany ....... 3915627

[51] Int. Cl.⁵ .............................................. G01S 7/48
[52] U.S. Cl. ........................................ 350/4; 342/25
[58] Field of Search ...................... 356/4, 5; 342/25

[56] References Cited

U.S. PATENT DOCUMENTS

| | | | |
|---|---|---|---|
| 4,119,379 | 10/1978 | Zindler | 356/4 |
| 4,164,740 | 8/1979 | Constant | 356/4 |
| 4,927,263 | 5/1990 | de Groot et al. | 356/4 |

Primary Examiner—Mark Hellner
Attorney, Agent, or Firm—Ralf H. Siegemund

[57] ABSTRACT

Optical radar includes a linear transmitter diode array with each diode in the array being individually controllable for transmitting a light pulse on being triggered; and a receiver diode array is positioned in relation to the transmitter array in conjunction with optical imaging means such that a diode of the transmitter array is imaged on the ground on the same area which is seen by a particular diode of the receiver array so that a 1:1 relation is established between a diode providing a particular transmitted light pulse and a diode that can receive said pulse.

4 Claims, 2 Drawing Sheets

OPTICAL RADAR

BACKGROUND OF THE INVENTION

The present invention relates to optical radar, particularly to a radar technology that uses lasers for purposes of generating range images, to be used in the navigation of aircraft or, more generally, general aerospace crafts and vehicles.

Range images are defined by images having or being composed of image points the content of which is not indicative of reflected energy but is representative of the distance of that point which produced the reflection from say the range finder camera or reference plane. In the case of a black and white range image or, preferably, of a range image having several gray stages, it is customary to represent an object point that is very close in a rather dark fashion while an object point that is quite far is relatively brightly imaged. Range finder images of this kind are used for example for navigation or updating or correction of navigation and navigational information in aerospace vehicles.

These range finder images represent the area or territory passed over by the vehicle and the representation is subject to a line-by-line scan. For purposes of obtaining this kind of scan it is customary to use a mechanically moved, scanning part such as pivoting mirrors or rotating polygon mirrors or the like. These movable components deflect the laser beam in a line scan pattern and direct the beam particularly down to ground while a detector responds to the returning deflection. Basically this kind of an arrangement is sound but has the drawback that mechanically movable parts simply limit the use life of the equipment; also storage time (inventory) is quite limited, and it was found moreover that for high speed aircraft this kind of scanning is actually rather poorly suitable. As state of the art please refer to German applications 292095 and 2909090 which are based on Japanese patent applications for which there may be U.S.-counter parts.

DESCRIPTION OF THE INVENTION

It is an object of the present invention to provide a new and improved optical radar system, arrangement and equipment that has a higher use life and stores well even for long periods of time.

It is therefore a particular object of the present invention to provide a new and improved optical and in particular, a laser radar for acquiring primary range images under utilization of a light source, a light receiver and signal processing equipment.

In accordance with the preferred embodiment of the present invention the object and particularly the particular object is obtained in that the light source and transmitter as well as the detector or receiver each are constructed as linear diode array which cooperates with one or several pieces of optical equipment, such that a light pulse that is emitted by a particular diode of the transmitter array following the reflection of and within a particular raster field that is hypothetically superimposed upon the object is imaged upon a particular diode of the receiver array. The two diode arrays are arranged parallel to each other, they may be tilted or tiltable in relation to each other, and electronic equipment is provided that calculates from the transit time between light pulse emission and receiving of the reflection, specific relevant data.

Therefore it can be seen that the inventive equipment avoids pivotal deflection of a beam. The scanning motion is carried out strictly electronically through triggering and enabling of diodes in the arrays. Instead of using mechanical deflection units of one kind or another, two diode arrays are used and arranged, as stated, parallel to each other, one being a transmitter and the other one receiver. They are adjusted in relation to each other, in conjunction with one or several optical imaging devices so that light emitted by a particular diode, on being intercepted by a particular object point, will then and only then be reflected and received by a particular diode within the receiver array. The slight tilt proposed above is desirous in order not to miss reflections of vertically down directed light. The scanner of the present invention can be usefully employed in a range finding system of copending application, atty docket Dor/M328-s, whose content in turn is incorporated by reference for several explanatory purposes.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates an inventive radar laser for utilization and conjunction with an aircraft or another aerospace vehicle which moves at a speed V, and in elevation H above ground. The particular vehicle is provided with navigational equipment including an inventive scanner which will scan the territory and area underneath. It is important that the scanning and sensor equipment does not have any mechanically moving parts. The radar is in fact established by two linear diode arrays, one being the transimitter array TA, the other one a receiver array RA. They are arranged parallel to each other and affixed to the bottom of an aircraft. They either "look" straight down or slightly ahead in forward owing to slight tilt.

Figure 1:
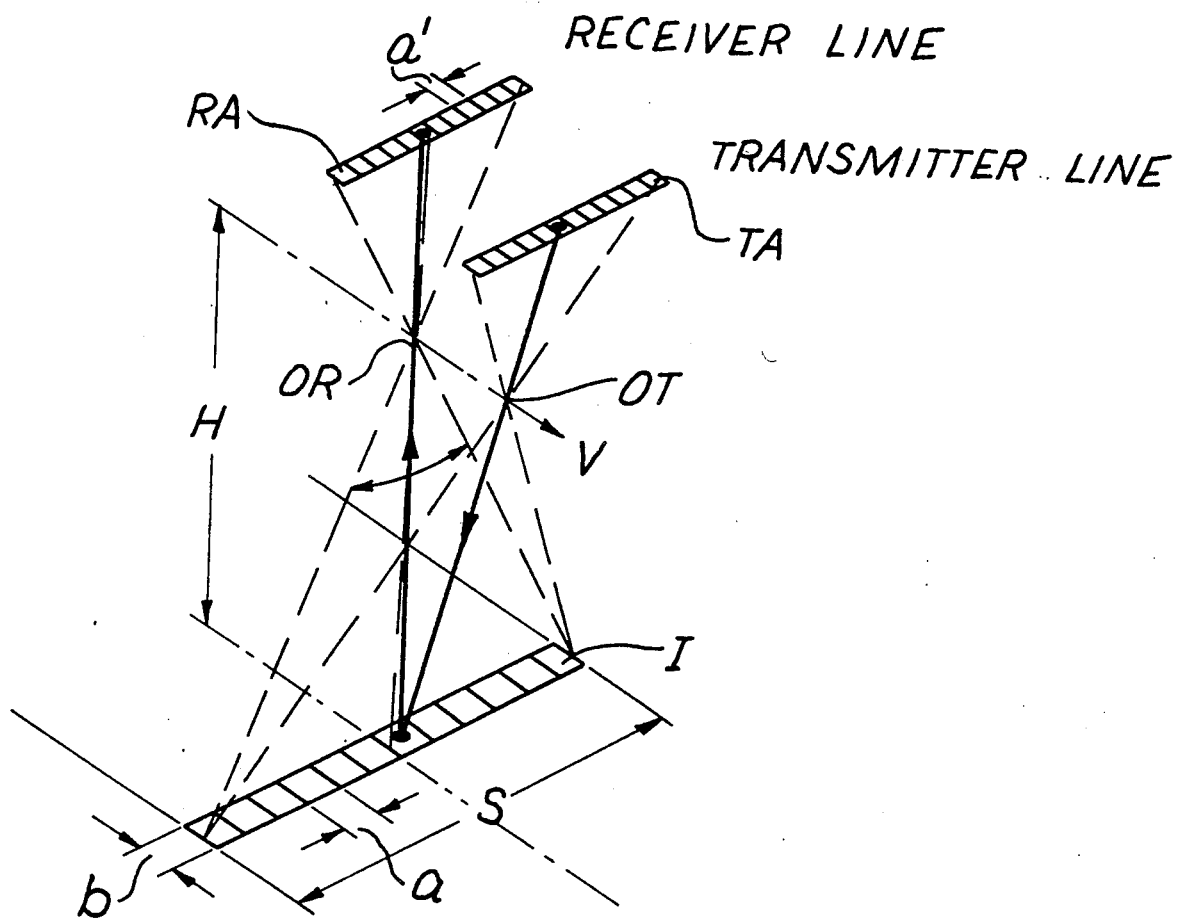
FIG. 1 is a somewhat schematically a view of an equipment constituting the preferred embodiment of the present invention for practicing the best mode thereof.

Optical equipment is schematically indicated by optical center points OT and OR; these optics image the respective array strip onto ground and a tilted arrangement of the diode arrays is such that the images are superimposed. Reference numeral I refers to the image of the two diode arrays as they appear in fact in superimposed relationship; of course, strickly speaking only optic OT images the TA-array onto ground, and that image, I, is then the object that is imaged by OR onto the receiver array RA. Moreover each diode of array TA is imaged onto ground as an elemental raster within array I; and optic OR images that elemental diode image onto a receiver diode. The reference character S indicates the length of the image of the entire transmitter array on ground. a' and b' are the dimensions of such a diode in the arrays, and a and b are the dimensions of the elemental image area if such a diode in the array, on the ground. The scanning operation is carried out electronically through stepwise enabling the diodes of the two arrays in a correlated and actually correlating fashion.

Figure 2:
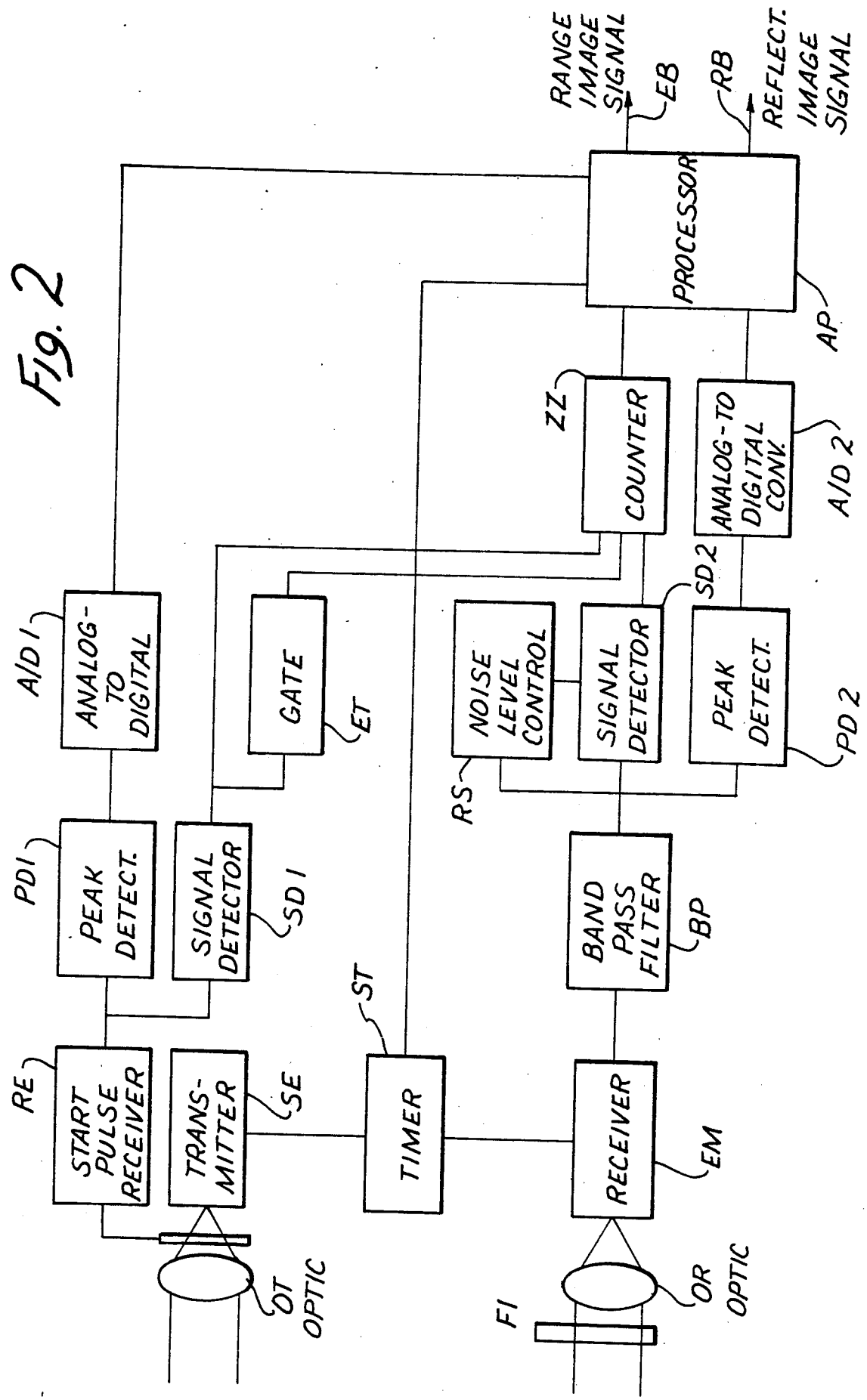
FIG. 2 is the electronic circuit and block diagram associated with equipment in FIG. 1.

FIG. 2 illustrates, as stated, a block diagram for operating the equipment shown in FIG. 1 particularly for operating the transmitter diodes and for responding to the output of the receiver diodes in the respective arrays. The arrangement shown is particularly designed to generate range images under utilization of a light pulse transit detection method but with reflection images resulting from reflected and return scattered components of a transmitted light pulse as supplemented information. The reflection of course is produced in either by various objects on the ground. The scanning of the sensor for purposes of generating a range image and a regular reflection image is provided through the outputs EB and RB furnished by the circuit. The production of these outputs is carried out sequentially as follows.

An electronically operated, light pulse transmitter unit SE which includes the transmitter diodes of array TA also includes the immediate operating circuit for that array. The diodes emit light that is transmitted to ground via optic OT. Analogously, a light pulse receiver unit EM includes the receiver diode array and receives light that is reflected via optic OR. Units SE and EM are controlled from a system timer ST. In this particular example it is assumed that there are 64 transmitted diode elements in the linear array of SE and 64 receiver diodes make up the receiver array in unit EM. There are then correspondingly 64 image elements (a×b) which through coaxial or biaxial optical system are imaged onto the ground. A portion of the light emitted by the transmitted unit SE is coupled out of the signal and used in the reference receiver RE.

In order to generate an electric signal for acquiring a starting pulse, reference receiver RE feeds a signal to the signal detector SD1 primary starting signal for timing. In addition the transmitted power is detected through a first peak value detector PD1. Reference charter A-D1 refers to a analog-to-digital converter responding to the peak value detector output PD1. The output of A/D1 is thus a digital indication of the actual optical power output of a single transmitter diode. The start pulse for SD1, initiates the beginning of measuring the transit time interval and for this an interval counter ZZ is used. The signal SD1 moreover starts a temporal gate ET i.e. it closes that gate which is provided for suppressing any incorrect, near range echo. After a particular period of time has been counted by counter ZZ, the blocking effect of gate ET is removed. That blocking effect is such that it prevents counter 22 from responding to any echo signal until this minimum count has been reached. This minimum count requires a minimum distance from the aircraft well above any value for any ground elevation.

The 64 elements in the receiver EM are multiplexed (not shown as conventional) and the signals are fed to a signal processing stage that is common to all channels. Instead of electronic multiplexing one could use optical through an integrated optic circuit multiplexer which really is only a matter of availability of suitable equipment and thus does not involve the principle of this invention. For minimizing noise light pulses reflected from and by the target object underneath pass first an optical filter F1 and the common output of the diodes in the receiver array in turns is subject to band pass filtering in the filter BP.

The receiver echo of course varies strongly in case the range and distances vary but also the reflectivity of the object is a material factor that determines the intensity of the echo signal. Therefore one needs a type of processing which is specifically selective in the stop pulse production, namely the pulse needed for stopping the transit time measuring and counter ZZ. It is suggested to use the so called constant fraction trigger principle in a second peak detector, SD2. A noise level control RS as well as the range gate ET reduce the probability of erroneous echo detection by suppressing e.g. pulses that cannot possibly be genuine echos, while a definite distinction has to be made between genuine reflected and noise. The noise transmission circuit RS controls the peak detection SD2 to prevent spurious signals from causing that detection to respond. The basic function of detector SD2 is to reset or stop counter ZZ. This counter ZZ is the counter for the echo transit measurement and the interval between transmission of a pulse and receiving of an echo. As stated the counter ZZ receives of course a start signal for counting from stage SD1 and after the suggestion period (gate ET) is stopped by a signal from SD2.

The count state of counter ZZ represents the distance between the craft and the object that reflected the light emitted by a a particular diode and which was received by a particular diode, whose response stopped the counter. This time interval as metered by counter ZZ (and not suppressed in ET) is one range image element, representing the distance of an element a×b within the array of images I from the aircraft. The processor AP establishes one range image element after the other and assembles them into a line pursuant to one scan, and sequential images then produce a more or less endless field of range imaging as the craft proceeds.

The amplitude of the echo signal being proportional to received optical input is also fed to a second peak value detector PD2 and through a second analog-to-digital converter A/D2, that signal is fed to the evaluating processor AP. This processor processes power input (from A/D1) as well as range data under suitable normalization processes in order to obtain the reflectivity image RB which is to be produced parallel to range image EB.

The individual transmitter and receiver fields of view have to be matched to each other utilization of optical and electrical filters and the matching procedure then involves also noise control with detection threshold matching (SD2). This way one obtains an echo signal that is to be contributed to the transmitted signal rather than other factors such as environmental or ambient illumination, night light vs daylight variations variable reflections of the sun and clouds, seasonal variations and so forth. This way one obtains rather objective range measuring values with a minimal failure rate. The adjustable gate ET limits the time and, therefore, the range to be considered is valid in order to avoid the needless processing of signals that cannot possibly be genuine range reflections.

The invention is not limited to the embodiments described above but all changes and modifications thereof, not constituting departures from the spirit and scope of the invention, are intended to be included.

We claim:

1. Optical radar comprising,
   a first linear diode array with each diode in the array being individually controllable:

first circuit means connected to the diodes of the array for causing the individual diodes to transmit a light pulse on being triggered;

a receiver diode array different from the transmitter array positioned in side by side relation to the transmitter array and next to it but not behind it; optical imaging means positioned such that a diode of the transmitter array is imaged onto the ground and in the same area which is seen by a particular diode of the receiver array so that a 1:1 relation is established between a diode of the transmitter array providing a particular transmitted light pulse, and a diode of the receiver array that can and does receive said light pulse; and second circuit means connected to the diodes of the receiver array as well as to the first circuit means for determining the transit time of the light pulse, commencing with triggering of a transmitter array diode and ending with receiving of the light pulse by the respectively associated receiver array diode.

2. Radar as in claim 1 wherein a transmitter diode is a laser diode.

3. Radar as in claim 1 wherein the two arrays are arranged in parallel in relation to each other.

4. Radar as in claim 3 wherein the arrays have a slight tilt in relation to each other.

* * * * *